United States Patent [19]

Gordy et al.

[11] Patent Number: 5,378,046
[45] Date of Patent: Jan. 3, 1995

[54] PORTABLE SHOPPING CART SEAT BELT

[76] Inventors: Thomas L. Gordy; Lee S. Gordy, both of 707 H St., Salida, Colo. 81201

[21] Appl. No.: 2,792

[22] Filed: Jan. 11, 1993

[51] Int. Cl.⁶ .............................................. A62B 35/00
[52] U.S. Cl. .............................. 297/485; 297/256.17; 182/3
[58] Field of Search ........... 297/485, 464, 468, 256.17; 224/224, 268; 182/3

[56] References Cited

U.S. PATENT DOCUMENTS

| | | | |
|---|---|---|---|
| 1,298,615 | 3/1919 | Wilkinson | 297/485 X |
| 1,600,027 | 9/1926 | Welsand | 182/3 |
| 3,941,208 | 3/1976 | Germain | 182/3 |
| 4,637,622 | 1/1987 | Burgard | 297/485 X |

FOREIGN PATENT DOCUMENTS

| | | | |
|---|---|---|---|
| 444679 | 2/1968 | Switzerland | 182/3 |
| 164 | of 1909 | United Kingdom | |
| 958710 | 5/1964 | United Kingdom | 297/485 |

*Primary Examiner*—Peter R. Brown
*Attorney, Agent, or Firm*—Phillip A. Rein

[57] ABSTRACT

A portable, waist belt restraint for restraining a child in a shopping cart having increased utility due to its anchoring apparatus. An adjustable coupling torso/waist belt and a snap hook anchoring apparatus that are integral. The nature of portability created by the snap hook anchoring apparatus, allows the subject child to placed in and anchored to a shopping cart, and unanchored and removed without detaching the waist belt from the child.

3 Claims, 1 Drawing Sheet

PORTABLE SHOPPING CART SEAT BELT

BACKGROUND OF THE INVENTION

This invention disclosed in this patent application pertains to a portable child restraint belt which can easily be anchored and unanchored from a shopping cart while the waist belt remains attached to the subject child.

Presently, known shopping cart seat belts in use come permanently attached/anchored to the cart seat. Common Problems Are:

1) When used, belt only crosses over the abdominal region or the top of legs of the subject child, allowing room for the child to slide up from under the seat belt.
2) Each time one utilizes the provided seat belt, it should be adjusted for fit.
3) Many times seat belts are damaged or not adjustable.
4) And if there is a seat belt provided, many of them are dirty, therefore their use avoided.

In 1991 the National Safety Council reported that in 1990 there were 19,191 shopping cart related injuries to children under the age of 5 years of which 15,251 were head injuries.

There is a need, therefore, for an improved shopping cart seat belt which will appeal to increased usage.

SUMMARY OF THE INVENTION

Due to the lack of shopping cart seat belts and/or their usage when available, there is a need for a new style of seat belt which will appeal to increased usage. This seat belt invention appeals to increased usage by offering desirable features of private/individual ownership, convenience, and anchoring portability while the seat belt remains attached to the subject child.

Because of private/individual ownership the belt can be fit to and used on one intended child. The adjustable waist belt with its coupler buckle can easily be applied and adjusted to fit snugly around the waist of a child. When not in use the belt apparatus can be stored in a small space such as a purse, auto glove compartment, or just stuffed in a garment pocket. Because of the belts private ownership, cleanliness can be maintained.

The anchor apparatus creates the portability of the seat belt which gives the invention its uniqueness. The anchor apparatus is comprised of a snap hook affixed to the waist belt by a short strap. While the said waist belt is attached around the subject child, with one hand, the snap hook can be snapped onto a wire, either in the basket or seat portion of the shopping cart, thus anchoring the child to the cart. As easily as the snap hook was applied, it can be unsnapped with one hand and child removed from the shopping cart with the waist belt still attached to the child. This portability allows the seat belt to be applied prior to entering a store or prior to leaving home without causing discomfort to the subject child.

Figure 1:
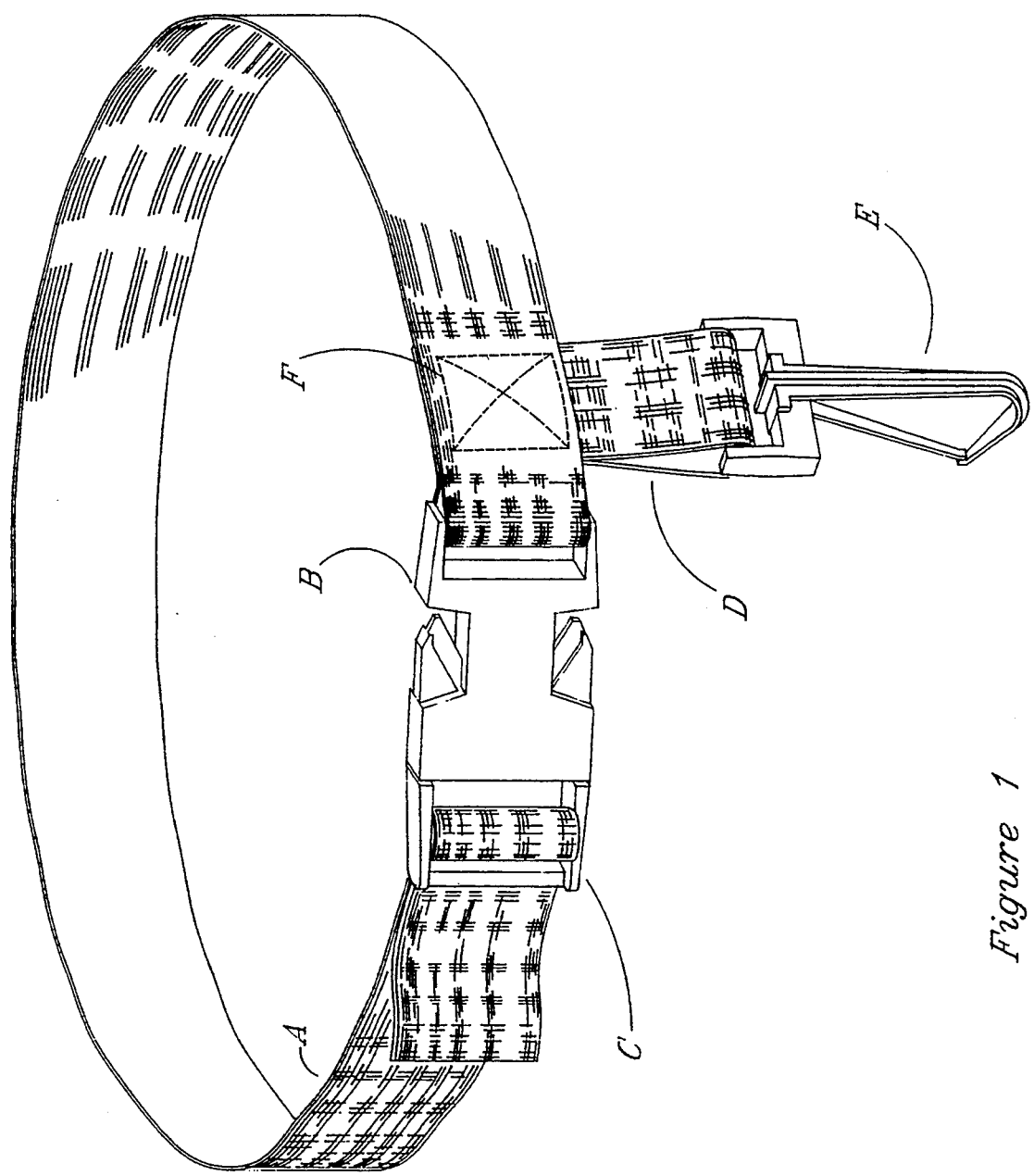
FIG. 1, is an oblique drawing which depicts the entire invention; member parts are referenced by capital letters.

A - is the waist belt strap
B - is the box side of the coupler buckle with a closed loop retainer by which one end of said member A strap is put through retainer loop and overlaid back on itself creating a closed loop; thus fastening member B to one end of said member A.
C - is the serpentine portion of the coupler and allows for adjustment of the other end of said member A strap when fed into and through the ladder bars of this member.
D - anchoring strap in closed loop fashion affixed to said member A strap.
E - anchoring snap hook which is incorporated on the said member D anchor strap.
F - is the stitch point; point at which said closed loop of member A strap and said closed loop of member D strap overlap and are permanently affixed to each other.

DETAILED DESCRIPTION

FIG. 1, is an oblique drawing of an enclosed looped belt coupled together with a strap adjusting serpentine coupler and affixed to the belt is a short looped strap with a snap hook attached. Reference to piece members by capital letters.

A - is a strap of sufficient length which is attached at both ends to each side of the coupler forming a torso/waist belt.
B - is the box side of the coupler, with a retainer loop for the purpose of affixing permanently to one end of said member A strap by means of said A strap being put through the retainer loop and connect back on itself forming a closed loop.
C - is the strap adjusting, serpentine side of the coupler, which when said member A strap is put into and through its ladder bars, allows for said A strap adjustment.
D - is the anchor strap which forms a short closed loop and is affixed to the said member A strap.
E - is a snap hook and is the anchor mechanism which is attached to said member D anchor strap by putting one end of said D strap through loop retainer and overlay back on itself forming a closed loop.
F - is the stitch point where the closed loop of said member D anchor strap and the closed loop of said member A overlap and are permanently affixed to each other.

This invention is intended to be used as a portable anchoring shopping cart, child restraint, seat belt offering a snug fitting waist belt. The uniqueness which distinguishes this shopping cart seat belt from others, is the manner of which the anchoring apparatus is comprised and operates thus creating its state of portability.

It will thus be seen that the objects set forth above, and those made apparent from the foregoing description, are effectively attained and since certain changes may be made in the above construction without departing from the scope of the invention, it is intended that all matters contained in the foregoing description or shown in the accompanying drawing shall be interpreted as illustrative and not in a limiting sense.

It is also to be understood that the following claim is intended to cover all of the generic and specific features of the invent ion herein described, and all statements of the scope of the invention which, as a matter of language, might be said to fall there between.

What is claimed:

1. A child waist belt restraint having increased utility due to its portability anchoring feature, comprising:

a buckle having first and second engageable sides, said first side including an aperture, and said second side including a serpentine connector;

a waist belt having two ends, one of said ends extending through the aperture of said first side of said buckle and being attached to itself at an attachment point adjacent to said first side; the other of said ends extending through the serpentine connector of said second side of said buckle for an adjustable attachment thereto; and an anchor apparatus comprised of a closed loop strap fixed to said waist belt at said attachment point and extended perpendicular thereto;

whereby said anchor apparatus can be connected to a wire portion of a shopping cart to anchor a child within the shopping cart.

2. A child waist belt restraint which is portable, washable, and collapsible, comprising:

a coupler having first and second engageable sides, said first side including an aperture, and said second side including a serpentine connector;

a waist belt of a strap material having two ends, one of said ends extending through said aperture of said first side of said coupler and being attached to itself at an attachment point adjacent to said first side, and the other of said ends extending through said serpenting connector of said second side of said coupler for an adjustable attachment thereto;

an anchor apparatus includes a closed loop strap fixed to said waist belt at said attachment point and extended perpendicular thereto;

said anchor apparatus includes a connector member connected to said closed loop strap and operable to be releasably connected to a portion of a shopping cart to restrain a child in the shopping cart.

3. A child waist belt restraint which is portable, washable, and collapsible operable to be mounted about a waist portion of a child and connected to a shopping cart, comprising:

a waist belt of a strap material having one end anchored to an engageable first side of a coupler and an opposite end adjustably connected to an engageable second side of said coupler;

said first side having an aperture with said one end of said waist belt extending through said aperture and being attached to itself at an attachment point adjacent to said first side;

said opposite end of said waist belt extending through said second side of said coupler for an adjustable attachment thereto; and an anchor apparatus includes a closed loop strap fixed to said waist belt at said attachment point adjacent said first side of said coupler and extended perpendicular to said attachment point, and a connector member connected to an outer end of said closed loop strap;

whereby said waist belt is operable to be securely mounted about a waist portion of a child with said waist belt positioned with said coupler and said anchor apparatus against a central back portion of said child, and the child is unable to reach said coupler and said connector member which prevents respectively uncoupling and disconnecting thereof.

* * * * *